Dec. 22, 1959  J. H. JARVIS ET AL  2,917,957
METAL WORKING MACHINE
Filed Aug. 3, 1955  3 Sheets-Sheet 1

INVENTORS
John H. Jarvis
Dean R. Swan

Dec. 22, 1959  J. H. JARVIS ET AL  2,917,957
METAL WORKING MACHINE
Filed Aug. 3, 1955  3 Sheets-Sheet 2
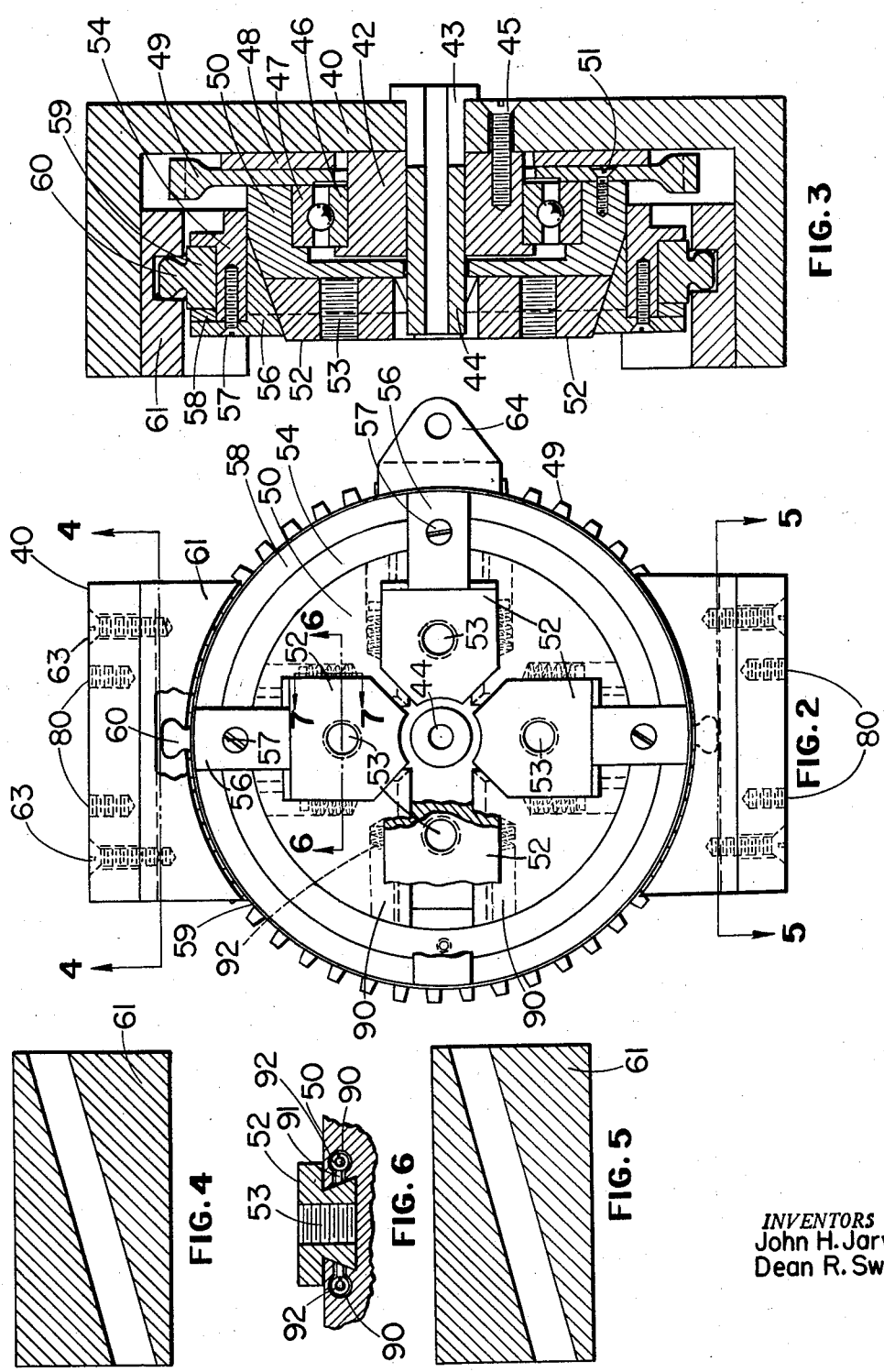
INVENTORS
John H. Jarvis
Dean R. Swan

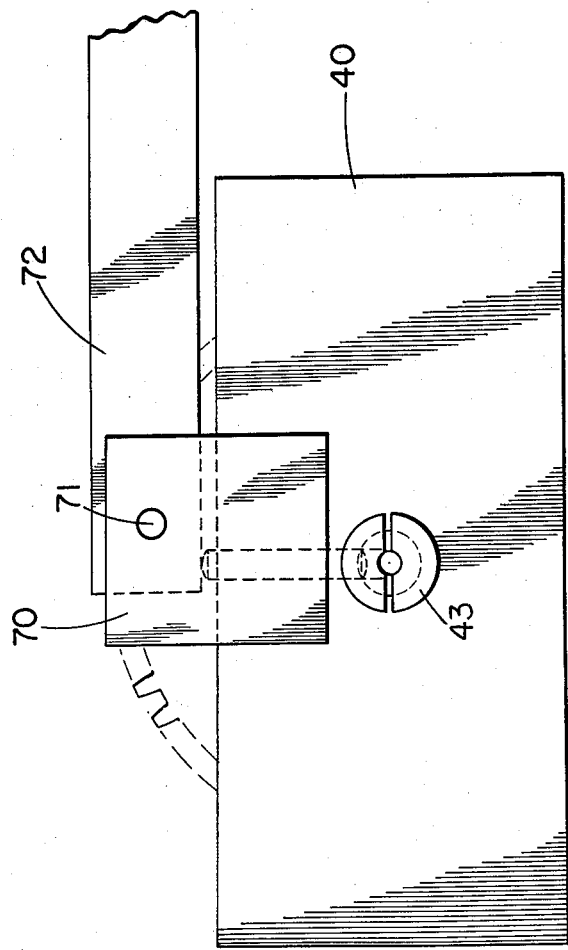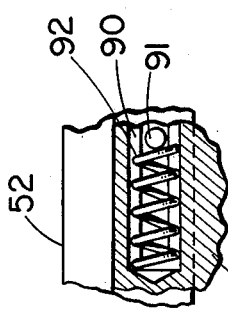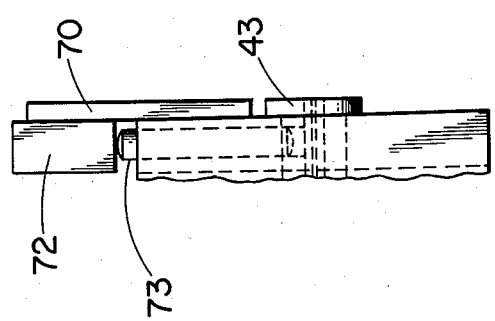

United States Patent Office 2,917,957
Patented Dec. 22, 1959

2,917,957
METAL WORKING MACHINE

John H. Jarvis, Revere, and Dean R. Swan, Bedford, Mass.; said Jarvis assignor to said Swan Application August 3, 1955, Serial No. 526,131

1 Claim. (Cl. 82—20)

This invention relates to metalworking machines in general and to automatic screw machines in particular.

Various types of automatic screw machines have been in use for many years in the metal working industry. Even more widespread use of such machines is desirable but is prevented by the relatively high cost of parts produced on screw machines. Other methods of shaping metal, such as casting, forging and punching are often less expensive ways of producing certain metallic shapes. Many improvements in the design of almost any part which is presently cast, forged or punched may be made if the cost of producing such parts on screw machines may be reduced appreciably so that the unquestioned precision of screw machines may be economically utilized. The high cost of screw machine parts depends mainly on the relatively high cost of operating presently known machines and their relatively low rate of production. The present state of the art is such that chance of any significant improvements in screw machines is very small.

Attempts have been made to increase rate of output by using multi-spindle machines. In such machines, a number of lengths of raw stock are machined simultaneously. Unfortunately, the number of spindles in one machine is limited in practice. The mechanical complexity of the required mechanism becomes so great that a great number of spindles is not feasible.

There are some single spindle machines which produce parts at a high rate. However, since all such machines attain a high rate of production only under certain conditions and for certain parts, they are so restricted in their application that they are hardly screw machines in the accepted sense. Almost all presently known single spindle machines of this type depend primarily on the proper application of newly discovered or invented materials to perform the same functions as the older type machines. Although such measures are ordinarily obvious, considerable ingenuity is often required to utilize the newer materials to the greatest advantage. Nevertheless, it may be said that there is no basic difference in design between the newer high speed machines and the well-known single spindle machines.

Reduction in the cost of operation has been made difficult by the requirement that screw machines generally be capable of performing as many different machining operations as possible. This requirement has, in the past, restricted simplification of the design of the screw machines. In fact, experience has shown that it is better to dispense with simplification and to accept the necessity of employing a highly-skilled mechanic to set up a screw machine. Other improvements in the design of screw machines to reduce the cost of operation are also restricted by the aforementioned requirement. For example, reel feeding methods, in spite of their manifest advantage over the commonly used bar feeding methods, have been incorporated in relatively few types of machines.

Even in those machines which have been designed for special purposes, the cost of operation is high. The faster such machines operate, the more manual labor is required to ensure proper loading. Moreover, the cost of changing such machines over to produce a different part is usually very high.

Changing a screw machine, or setting up a machine, is presently one of the main factors contributing to cost of operation. As has been pointed out, set-up is performed by highly-skilled mechanics. Even very experienced persons often are forced to use a cut and try method of setting up machines. That is, many machines are best set-up by running stock through the machine and adjusting the tools until the desired piece is obtained. Such a method is wasteful and must be eliminated in every possible instance. Therefore, it is an object of this invention to increase the efficiency of screw machines.

It is another object of this invention to increase the rate of production of screw machines.

It is another object of this invention to reduce the cost of operation of screw machines.

It is still another object of this invention to provide a screw machine which is easily adapted to almost all machining operations.

This invention attains its objects in the following general manner. Work stations are serially disposed along a common supporting base. Associated with each work station in a practical embodiment are a chuck to guide and support the stock, a clamp to engage the stock at predetermined times, at least one appropriately shaped tool mounted on a tool head, a driving mechanism to rotate the toolhead, and a system of cams to synchronize the clamp and tools in such a manner that the clamp at each station and the tools at each station are simultaneously moved to engage the stock. It should be noted that the clamps at each work station are not essential to this invention, but are desirable, especially when rather small stock is being machined. Only one clamp is required if stock is sufficiently rigid to withstand torsion of cutting. The stock being machined may be taken off a large storage reel and fed through the machine intermittently. The stock feed mechanism is synchronized with the cam system operating the tools and clamps at the work stations so that the stock is advanced when the tools and clamps are not in contact with the stock. An additional adjustment may be provided on the stock feed mechanism to limit the amount of stock fed into the machine each time the feed mechanism is actuated. It may be seen that if the distance between the work stations be properly adjusted and the tools at each station be properly shaped, that a number of machining operations may be performed simultaneously on a single piece of stock. The stock being stationary when the tools are actuated, any desired machining operation is possible. Furthermore, each operation may be performed more quickly if a number of tools are simultaneously actuated at each work station, thereby dividing the work and allowing operation at higher rates without special provisions to minimize tool wear.

For a better understanding of the present invention together with other and further objects, features and advantages, reference should be made to the following description which is to be read in connection with the accompanying drawings in which:

Fig. 2 is an orthogonal view of a work station showing in detail how form tools may be affixed to a work station;

Fig. 3 is a cross-sectional view of the work station shown in Fig. 2 except the tools are not shown;

Figs. 4 and 5 are cross-sectional views of portions of the base of the work station of Fig. 2 showing the sloping channels explained hereinafter;

Figs. 6 and 7 are cross-sectional views of a tool slide and tool slide holder in Fig. 2 showing a tool retracting device; and Figs. 8 and 9 are orthogonal views of a stock lock as used in Fig. 1 and show the details of construction thereof.

Figure 1:
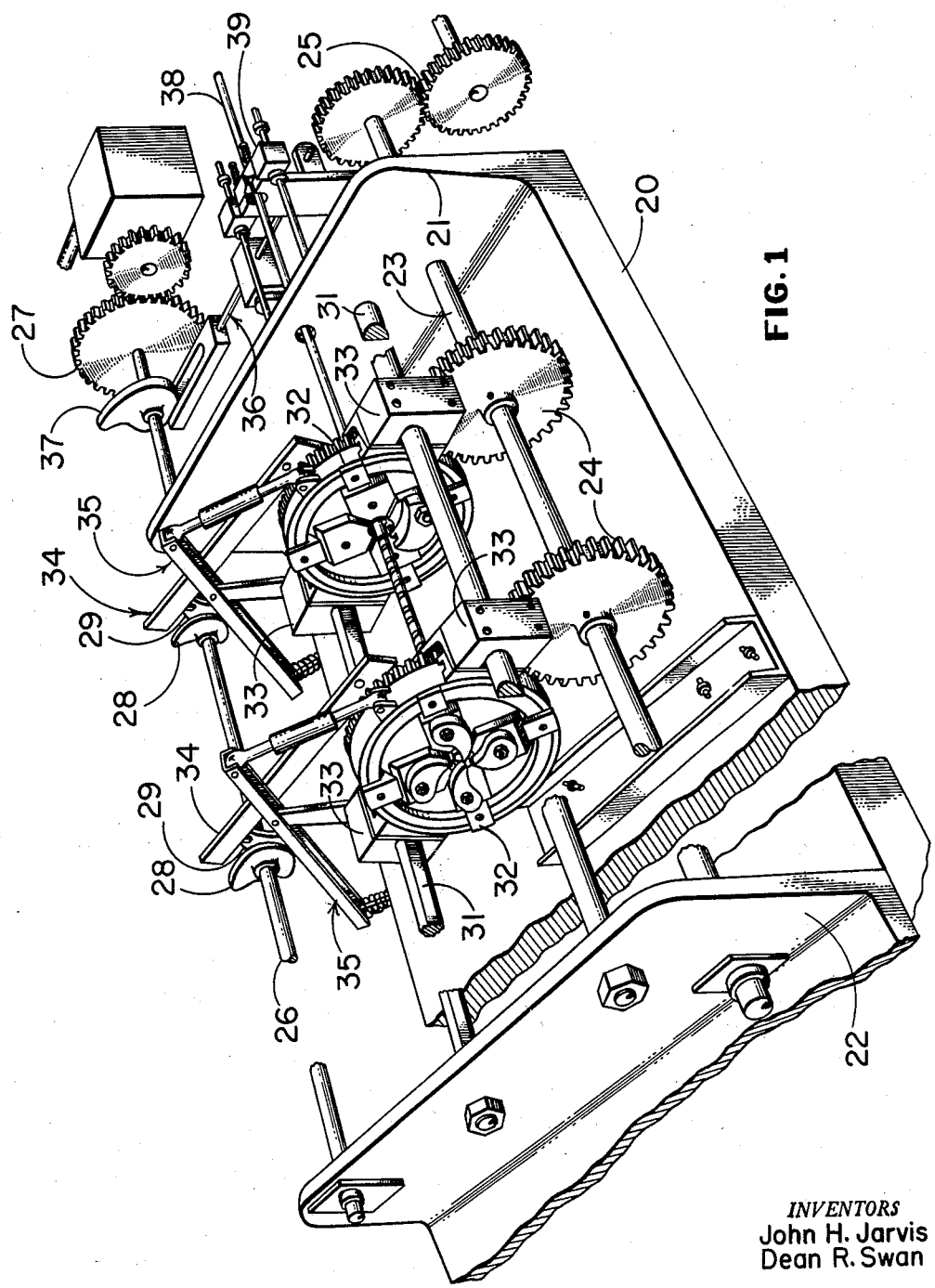
Fig. 1 is a perspective view of one embodiment of the present invention showing a two station machine.

The arrangement of parts in an embodiment of this invention may be seen in Fig. 1. An elongated base plate 20 supports the entire mechanism. An upwardly extending web 21 may be formed integrally with the first end of the base plate 20 as shown. A movable web 22 is affixed to the second end of the base plate 20 and parallel to the web 21. Two drive shafts 23 and 26 are rotatably supported between the webs 21 and 22 parallel to each other and to the base plate 20. The first drive shaft 23 extends through the web 21 a predetermined distance. Spur gears 24 and 25 are secured to the first drive shaft at predetermined positions. The spur gear 25 may be meshed with a gear system and thereby connected with a drive motor (not shown). A tool actuating cam 28 and a stock lock actuating cam 29 are mounted on the second drive shaft 26 opposite each of the spur gears 24. A pair of work station positioning shafts 31 are mounted parallel to the drive shafts 22, 26 and inwardly thereof between the webs 21, 22. Each of the work station positioning shafts 31 has a longitudinal flat formed thereon as shown. The work station positioning shafts 31 are so oriented that the flats are parallel to each other. Work station positioning blocks 33 are affixed to each of the work station positionnig shafts 31 at a position corresponding to each spur gear 24. A work station 32 is secured between each pair of blocks 33. A cam follower system 35 is connected between each tool actuating cam 28 and each work station 32. A second cam follower system 34 is connected between each stock lock actuating cam and each stock lock. The drive shaft 26 is extended through the web 21. A stock feed actuating cam 37 of any known type for intermittently feeding stock is affixed to the shaft 26 at a predetermined point. A second gear system 27 connects the drive shaft 26 to a drive motor (not shown). A third cam follower system 36 is connected between the stock feed actuating cam 37 and the stock feed mechanism 39.

The machine operates in the folowing manner. Stock 38 is fed through the stock feed mechanism 39 from a feed spool (not shown). The two aforementioned drive motors are energized so the drive shafts 23, 26 are rotated continuously. The stock feed actuating cam 37, the stock lock actuating cam 29 and the work station actuating cams 28 are so oriented on the shaft 26 and are so shaped that the stock feed actuating cam 37 is synchronized with the stock lock actuating cam 29 and the tool actuating cam 28. That is to say, the stock lock is released and the tools are retracted when the stock 38 is being advanced by the stock feed mechanism 39. The tools at each work station 32 are continuously rotating, being driven by the gears 24 through the gears (not numbered in this view) the teeth of which may be seen on the back side of each work station 32. After the stock 38 has been advanced by the stock feed mechanism 39, the various cams, 37, 28 and 29 continue rotating. By properly adjusting the position of the sams 28, 29 at each work station 32, the stock locks are activated and the tools are caused to engage the stock 38 to perform the desired operation through the cam follower systems 34, 35. It may be seen that the cycle is repeated automatically. It is also evident that the stock lock mechanisms may be disconnected and the stock feed actuating cam 37 and the tool actuating cams 28 may be positioned so that material may be removed from the stock 38 as the stock is being fed through the machine. Care must be taken to position the work stations 32 and the associated drive mechanism so that the machining operations are performed at the proper place along the length of the stock. This adjustment is most easily attained by setting the feed mechanism 39 so that exactly the correct length of stock will be fed during each cycle and then spacing the second work station the correct distance from the first. It may be advantageous to compensate for machining characteristics of various materials by providing variable speed and drive motors.

The details of a typical work station may be seen in Figs. 2, 3, 4, 5, 6 and 7. The components of the work station are mounted on a U-shaped base 40. As may be seen in Fig. 3, the outer edges of the base 40 are parallel to each other. These edges are spaced to form a line-to-line fit between the outer edges of the base 40 and the work positioning shafts 31 in Fig. 1. Drilled and tapped holes 80 may be provided to allow the work station positioning blocks 33 in Fig. 1 to be secured to the U-shaped base 40. The U-shaped base 40 is secured to the work station positioning blocks 33 and the work station positioning shafts 31 with machine screws to form a unitary structure. A bushing 44 and a split bushing 43 are centrally located in an opening in the U-shaped base 40. It should be noted that the inner opening of the bushing 44 and the split bushing 43 are such that a sliding fit is attained between the bushings 43, 44 and the stock. An inner bearing support block 42 is secured to the U-shaped base 40 by machine screws similar to the screw 45. The inner race 46 of a ball bearing is pressed on to the outer diameter of the inner bearing support block 42 against an outwardly extending flange, which may be formed integrally therewith as shown. A tool slide support 50 may be pressed over the outer race 47 of the ball bearing. A spur gear 49 may be secured to the outer race 47 of the ball bearing by machine screws such as that shown by screw 51. A spur gear is shown since a practical embodiment of the invention has used such a gear. However, spiral gears, belts or other well known driving means may be used. A thrust bearing 48 is placed between the spur gear 49 and the U-shaped base 40 as shown. Four tool slides 52 are slidably mounted in radial dovetails formed in the tool slide support 50. Two slots 90 adjacent the radial dovetails are provided. Helical springs are placed in each of the slots. A tapped hole 53 is provided in each tool slide 52 to attach a tool (not shown) thereto. A transverse hole is provided in each tool slide support 50 to secure a pin 91. An outer bearing ring 54 is fitted over the tool support 50 as shown more clearly in Fig. 3 to obtain a sliding fit between the outside of the tool slide support 50 and the outer bearing ring 54. A tool slide actuating wedge 56 is attached to the outer bearing ring 54 by machine screws such as the screws 57 and spaced therefrom by the retaining ring 58. A ring 59 is mounted on the outer side of the outer bearing ring 54 as shown. Two outwardly extending pins 60 may be integrally formed on the ring 59 as shown. Two guide blocks 61 may be affixed to the inner surface of the sides of the U-shaped base 40 by screws such as that shown by screw 63. A sloping channel may be formed in each of the guide blocks 61 as shown in Figs. 3 and 5 to accommodate the pins 60. A tab 64 is affixed to the ring 59 approximately midway between the pins 60.

The station operates as follows. The spur gear 49 is meshed with the spur gear 24 in Fig. 1. The outer race 47 of the ball bearing, the tool slide support 50, the tool slides 52, the outer bearing ring 54, the wedges 56, and the tools are rotated continuously by the spur gear 49. The tool slides 52 are forced outwardly into contact with the tool slide actuating wedge 56 by centrifugal force and by the force of the springs 92 acting on the pins 91. The tool cam follower system, 35 in Fig. 1, is attached to the tab 64. When the cam follower system is actuated by the cam 28, the pins 60 are forced to follow the slope of the channels in the guide blocks 61. The outer bearing ring 54, the retaining ring 58 and the tool slide actuating wedge 56, being integral with the pins 60 are likewise forced to move the outer bearing ring 54 sliding along the tool slide support 50. The slope of the channels in the guide blocks 61 is such that the movement of the aforementioned parts is perpendicular to the plane of rotation of the aforesaid rotating parts. This means, for example, that when the tools are engaged on the stock that the parts have moved to the right as in Fig. 3.

The wedge-like configuration of the inner surface of the tool actuating wedge 56, in turn, forces the tool slides 52 inwardly and engages the tools on the stock. It should be noted that in the present embodiment four tools are cutting simultaneously although the exact number of tools is not critical. The springs ensure retraction of the tools from the stock when the machine is not in operation.

The work station may be changed over very quickly to perform different operations. It can be seen that the amount of stock removed may be varied simply by changing the mechanical linkage in the cam follower system 35 or by changing the tools. It is preferred, but not necessary, that the mechanical linkage in the cam follower system be capable of rough adjustment so that a variety of stock sizes may be machined and that a fine adjustment be provided so that any desired dimensions may be attained.

The stock lock mechanism may be clearly seen in Figs. 8 and 9. A stock lock cam follower system 34 of Fig. 1 is disposed adjacent to each work station. The stock lock cam follower system consists of a base 70 affixed to the U-shaped base 40 in Fig. 1. A pivot pin 71 is mounted in the base 70 and extending outwardly thereof. A rocker arm 72 is mounted on the pivot pin 71 and extends over the cam 29 in Fig. 1. An opening is formed in the U-shaped base 40 in Fig. 2 extending downward to a point adjacent the split bushing 43 in Fig. 2. A pin 73 is placed in the opening. When the cam 29 rotates, the rocker arm 72 pivots and forces the pin 73 downward against one half of the split bushing 43. The bushing then presses against the stock, thus holding it in position during the time the machining operation is being performed.

Accessories and auxiliary equipment which may prove advantageous in the operation of a machine shown in the foregoing description may be added without affecting the inventive concept underlying the machine. For example, tool cooling may be obtained by providing an oil reservoir, a pump and piping to circulate oil from the reservoir to the cutting edges of the tools. Or, in addition, a stock straightening device may be added between the stock feed reel and the stock feed mechanism. It should be noted that a stock straightening device is not required when commercially straight stock is used unless the part being made must be truer than such stock. In presently known machines, commercially straight stock may not be advantageously used because the stock, being rotated, often is so crooked that trouble is often encountered.

Although the invention has been illustrated and described in connection with a practical multi-station screw machine in which it has been incorporated, it is believed that, amongst other things, the concepts of serially disposing work stations along the length of screw machine stock and using a plurality of rotating cutting tools at each work station have general application in the design of screw machines. Furthermore, variations in the design of tools to perform machining operations other than those shown in the drawings and specification will suggest themselves to those skilled in the art. Such variations are believed to be within the spirit and scope of the present invention which should be limited only as necessitated by the claim.

What is claimed is:

In a metal working machine for removing material from stock with a plurality of cutting tools simultaneously removing a predetermined amount of material from said stock at a predetermined point along the length thereof, a rotary hollow head cutter tool comprising a base section, two upwardly extending arms being integrally attached to said base section to form a unitary U-shaped structure, an opening being formed through said base section parallel to said arms, a split bushing, said split bushing being frictionally supported in said opening and projecting therefrom a predetermined distance between said arms, the opening in said bushing being adapted to slidably support said stock, means intermittently operable on said split bushing to lock said stock, a plurality of tool slides, each of said plurality of tool slides being rotatably mounted on said split bushing on the projecting portion thereof and having a bevelled outer edge, means for continuously rotating said plurality of tool slides around said split bushing, a similar plurality of cutting tools, a separate one of said cutting tools being affixed to a separate one of said tool slides, and means for intermittently forcing said tool slides inwardly, said last named means including a tool slide actuating ring, the inner edge thereof being bevelled to match the outer edges of said tool slides and the outer edge thereof being adapted to cooperate with the inner surfaces of said arms.

References Cited in the file of this patent

UNITED STATES PATENTS

| | | |
|---|---|---|
| 540,233 | Claussen et al. | June 4, 1895 |
| 765,327 | Stillman | July 19, 1904 |
| 2,575,116 | Murray | Nov. 13, 1951 |
| 2,616,325 | Abbey | Nov. 4, 1952 |

FOREIGN PATENTS

| | | |
|---|---|---|
| 130,423 | Germany | May 6, 1902 |